C. B. TRUSSELL.
TRANSMISSION GEARING.
APPLICATION FILED NOV. 30, 1915.

1,236,789.

Patented Aug. 14, 1917.

Inventor
Clyde B. Trussell

Witnesses
L. B. James
N. R. Bishop

By Geo. W. Sues, Attorney

UNITED STATES PATENT OFFICE.

CLYDE B. TRUSSELL, OF OMAHA, NEBRASKA.

TRANSMISSION-GEARING.

1,236,789.   Specification of Letters Patent.   Patented Aug. 14, 1917.

Application filed November 30, 1915. Serial No. 64,263.

*To all whom it may concern:*

Be it known that I, CLYDE B. TRUSSELL, a citizen of the United States, residing at Omaha, in the county of Douglas and State of Nebraska, have invented certain new and useful Improvements in Transmission-Gearing.

My invention has for its object to improve the construction and operation of that class of gearing, especially adapted to be used in imparting a rotary movement to the driving axles of motor driven vehicles, to the end that a cheap positively operating transmission gear may be supplied, combining ease of operation and smooth, silent running qualities.

Another object is to provide a device of this general character, of a simple and inexpensive nature, and of a compact and durable construction, which shall be capable of convenient adjustment in connection with a driving spur or pinion.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification, and in which like numerals of reference indicate similar parts in the several views.

In my present invention I provide a mechanism employed to transfer power from a driving gear to a driven gear, the construction being such that the friction will primarily be on the axle and bearings of the driven wheels, instead of on the cogs or teeth at the point of contact, thereby greatly reducing friction and insuring ease of operation.

Figure 1:
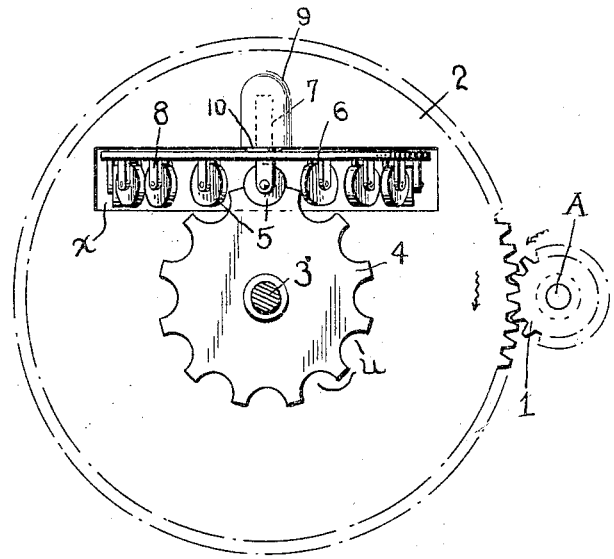
Figure 1 shows a broken detached detail of a transmission gear embodying my invention.
Figure 2:
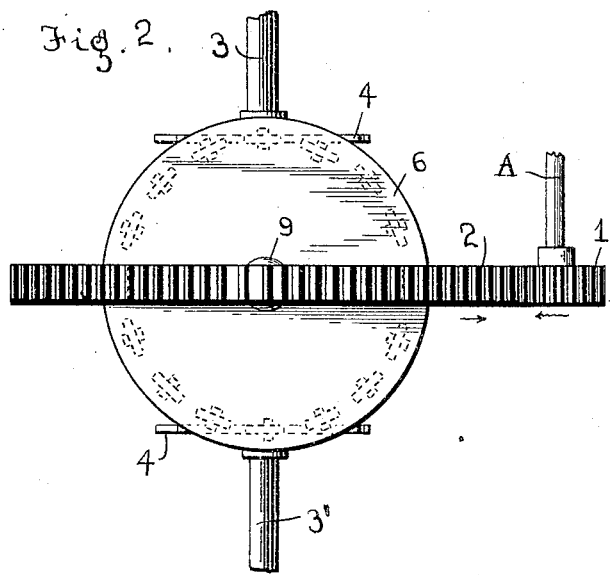
Fig. 2 is a top view of Fig. 1.

In carrying out the aim of the invention I employ a driving shaft A to which is securely fixed a driving pinion 1, as shown in Figs. 1 and 2. This driving pinion 1 meshes with an apertured driving gear 2 provided with the transversely extending slot or aperture $x$, as clearly shown in Fig. 1. This driving gear 2 is supported upon a suitable stub shaft, and held in alinement with the shaft supporting the gear 2, are the two wheel axles 3 and 3', shown in top view in Fig. 2. These axles are also held within suitable bearings.

At its inner end each axle is provided with a notched disk 4, each disk being provided with a plurality of spaced semi-circular notches $u$, more clearly shown in Fig. 1.

As shown the driving gear 2 is provided with a boss 9, and held within this boss is the stud 7 carrying the plate 6, the collar 10 being interposed between the boss and plate 6.

This plate 6 is provided with a plurality of circularly disposed and suitably spaced yokes 8, each yoke having two arms holding a suitable pin upon each of which is held a driving disk 5. Each yoke has a base plate by means of which each is fixed to the circular plate 6.

These disks 5 are so spaced that they successively ride into the spaced semi-circular notches $u$, as shown in Fig. 1. As shown in Fig. 2 at least two disks 5 are continually in engagement with the notched disks 4. The stud 7 is held in position within its boss 9 by any suitable means.

From the foregoing it will be understood that a rotary movement imparted to the driving pinion 1 imparts a rotary movement to the driven gear 2, and as this gear rotates it carries in a semi-circular path the notched disks $u$, each rotating in a direction similar to the direction of the driven gear 2. However, in turning a corner or when an obstruction is encountered by one of the wheels secured to the axles 3 and 3', these axles can be independently stopped or driven at a relatively greater speed. The change of speed is compensated by means of the disk 6, to which is then imparted a rotary movement so that the axles 3 and 3' may revolve at relatively different speeds.

Having thus described my said invention what I claim as new and desire to secure by Letters Patent is:

1. In combination, a gear having a transverse aperture, of two axles in alinement with said gear, a notched disk secured to the end of each axle, a circular carrying plate revolubly held within said aperture, and a plurality of revolubly held driving disks secured to said plate, said driving disks arranged to engage within the notches of said disks, as and for the purpose set forth.

2. In combination, a gear having a transverse aperture with a boss communicating therewith, of two axles held in alinement with said gear, a notched disk secured to the end of each axle, a circular carrying plate, a stud secured to said plate revolubly held within said boss, a plurality of spaced yokes secured to said plate, and a driving disk revolubly held to each yoke arranged to engage within the notches of said axle disks, as and for the purpose set forth.

In testimony whereof I affix my signature, in the presence of two witnesses.

CLYDE B. TRUSSELL.

Witnesses:
 RAY J. ABBOTT,
 Q. J. DUNN.

Copies of this patent may be obtained for five cents each, by addressing the "Commissioner of Patents, Washington, D. C."